(12) United States Patent
Kim et al.

(10) Patent No.: US 10,479,371 B1
(45) Date of Patent: Nov. 19, 2019

(54) APPARATUS AND METHOD FOR DETERMINING DRIVER DISTRACTION BASED ON JERK AND VEHICLE SYSTEM

(71) Applicants: HYUNDAI MOTOR COMPANY, Seoul (KR); KIA MOTORS CORPORATION, Seoul (KR)

(72) Inventors: Jin Kwon Kim, Gyeonggi-do (KR); Sam Yong Kim, Gyeonggi-do (KR); Yu Jin Yun, Suwon-si (KR); Seong Sook Ryu, Seoul (KR); Hwal Ly Lee, Seoul (KR); Byoung Joon Lee, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/167,776

(22) Filed: Oct. 23, 2018

(30) Foreign Application Priority Data

Jul. 19, 2018 (KR) ........................ 10-2018-0084069

(51) Int. Cl.
| | |
|---|---|
| *B60Q 1/00* | (2006.01) |
| *B60W 40/09* | (2012.01) |
| *B60W 40/109* | (2012.01) |
| *B60W 50/14* | (2012.01) |
| *B60W 40/08* | (2012.01) |
| *B60W 50/00* | (2006.01) |

(52) U.S. Cl.
CPC .......... *B60W 40/09* (2013.01); *B60W 40/109* (2013.01); *B60W 50/14* (2013.01); *B60W 2040/0818* (2013.01); *B60W 2050/0052* (2013.01); *B60W 2050/143* (2013.01); *B60W 2400/00* (2013.01); *B60W 2520/125* (2013.01); *B60W 2550/147* (2013.01)

(58) Field of Classification Search
CPC .... B60W 40/09; B60W 50/14; B60W 40/109; B60W 2050/0052; B60W 2520/125; B60W 2400/00; B60W 2050/143; B60W 2040/0818; B60W 2550/147
USPC ....................................................... 340/438
See application file for complete search history.

(56) References Cited

U.S. PATENT DOCUMENTS

| 5,717,606 A | 2/1998 | Hara et al. |
| 8,593,288 B2 | 11/2013 | Schmitz et al. |

(Continued)

FOREIGN PATENT DOCUMENTS

| JP | H06-080007 A | 3/1994 |
| JP | H07-290990 A | 11/1995 |

(Continued)

*Primary Examiner* — Tanmay K Shah
(74) *Attorney, Agent, or Firm* — Brinks Gilson & Lione

(57) ABSTRACT

An apparatus and method for determining driver distraction based on a jerk and a vehicle system are provided. The apparatus includes: a jerk calculating processor to calculate a lateral jerk of a vehicle based on driving information collected when the vehicle is traveling, an exception event detecting processor to detect an exception event defining a situation where the lateral jerk occurs during normal driving based on the collected driving information, and a determining processor to detect oversteering of the vehicle by comparing the calculated lateral jerk with a reference value and determine a driver distraction based on the detected oversteering and exception event.

18 Claims, 7 Drawing Sheets

(56) References Cited

U.S. PATENT DOCUMENTS

| | | | |
|---|---|---|---|
| 9,008,857 B2 | 4/2015 | Kim et al. | |
| 2012/0179349 A1* | 7/2012 | Yamakado | B60T 8/1755 |
| | | | 701/89 |
| 2015/0094899 A1* | 4/2015 | Hackenberg | B60W 50/082 |
| | | | 701/23 |
| 2017/0225710 A1 | 8/2017 | Yu et al. | |

FOREIGN PATENT DOCUMENTS

| | | |
|---|---|---|
| JP | 4244911 B2 | 1/2009 |
| JP | 2013-159276 A | 8/2013 |
| KR | 10-0774722 B1 | 11/2007 |
| KR | 10-1462067 B1 | 11/2014 |
| KR | 10-1540042 A | 7/2015 |

* cited by examiner

APPARATUS AND METHOD FOR DETERMINING DRIVER DISTRACTION BASED ON JERK AND VEHICLE SYSTEM

CROSS-REFERENCE TO RELATED APPLICATION

This application claims priority to and the benefit of Korean Patent Application No. 10-2018-0084069, filed on Jul. 19, 2018, the entire contents of which are incorporated herein by reference.

FIELD

The present disclosure relates to an apparatus and method for determining driver distraction based on a jerk and a vehicle system.

BACKGROUND

The statements in this section merely provide background information related to the present disclosure and may not constitute prior art.

In general, a vehicle system may detect a state of a driver while driving or may detect a change in a driving pattern, and may determine a driver distraction.

As an example, the vehicle system may monitor steering information, such as a steering angle and a steering torque of a vehicle, or lane detection information, such as a lateral location in a lane and a heading angle and may detect oversteering or fast steering, thus determining a driver distraction based on the detected oversteering or fast steering.

However, we have discovered that when detecting the oversteering or the fast steering using the steering information or the lane detection information, performance of a driver distraction determination logic of the vehicle system may be greatly influenced by a speed of the vehicle.

As an example, a low speed, a low steering ratio, or light steering feeling of the vehicle causes undesired high sensitivity in detecting information for the determination logic and thus increases errors in determining a driver distraction.

We have also discovered that a high speed, a high steering ratio, or heavy steering feeling of the vehicle substantially undermines a capability of detecting information for the determination logic and thus increases a probability that a driver distraction will not be detected.

SUMMARY

The present disclosure addresses the above-mentioned problems occurring in the prior art while advantages achieved by the prior art are maintained intact.

An aspect of the present disclosure provides an apparatus and a method for stably detecting a driver distraction without being greatly influenced by speed and steering information of a vehicle by monitoring a level of a lateral jerk and detecting the driver distraction and a vehicle system.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for determining driver distraction based on a jerk may include: a jerk calculating processor configured to calculate a lateral jerk of a vehicle based on driving information collected when the vehicle is traveling, an exception event detecting processor configured to detect an exception event defining a situation where the lateral jerk occurs during normal driving, based on the collected driving information, and a determining processor configured to detect oversteering of the vehicle by comparing the calculated lateral jerk with a reference value and to determine a driver distraction based on the detected oversteering and exception event.

The determining processor may be configured to compare a lateral jerk calculated at a specific time with a first reference value and determine the oversteering, when the lateral jerk calculated at the specific time is greater than the first reference value.

The determining processor may be configured to compare a lateral jerk cumulatively calculated during a predetermined time period with a second reference value and determine the oversteering, when the cumulatively calculated lateral jerk is greater than the second reference value.

The determining processor may be configured to determine the driver distraction, when the oversteering is detected and when the exception event is not detected.

The driving information may include a lateral acceleration. The jerk calculating processor may be configured to calculate the lateral jerk based on a low frequency signal of the lateral acceleration.

The jerk calculating processor may be configured to: calculate a difference value between a first low frequency signal of the lateral acceleration at a first predetermined time and a second low frequency signal of the lateral acceleration at a second predetermined time, divide the difference value by a sampling time, and calculate the lateral jerk therefrom.

The exception event may include at least one of a road pavement fault event, a curved road driving event, or a lane change event.

The driving information may include information about at least one of a lateral acceleration or a longitudinal acceleration. The exception event detecting processor may be configured to detect the road pavement fault event based on a level of a high frequency signal of the lateral acceleration or the longitudinal acceleration.

The exception event detecting processor may be configured to: determine the road pavement fault event when a high frequency component which is equal to or greater than a predetermined level is detected.

The driving information may include at least one of a steering angle or a vehicle speed. The exception event detecting processor may be configured to analyze a lateral behavior of the vehicle based on the steering angle and the vehicle speed and determine the curved road driving event, when a lateral velocity is maintained over a predetermined time.

The driving information may include at least one of a steering angle or a vehicle speed. The exception event detecting processor may be configured to analyze a lateral behavior of the vehicle based on the steering angle and the vehicle speed and determine the lane change event, when a lateral displacement corresponding to a lane width occurs.

The driving information may include front image recognition information of the vehicle. The exception event detecting processor may be configured to detect at least one of the curved road driving event, or the lane change event based on the front image recognition information.

The apparatus may further include an alarm controller configured to output an alarm signal, when the driver distraction is determined.

According to another aspect of the present disclosure, a method for determining driver distraction based on a jerk may include: calculating, a jerk calculating processor, a lateral jerk of a vehicle based on driving information collected when the vehicle is traveling, detecting, by an exception event detecting processor, an exception event defining a situation where the lateral jerk occurs during normal driving, based on the collected driving information, and detecting, by a determining processor, oversteering of the vehicle by comparing the calculated lateral jerk with a reference value and determining a driver distraction based on the detected oversteering and exception event.

According to another aspect of the present disclosure, a vehicle system may include: at least one sensor configured to detect driving information when a vehicle is traveling, and a driver distraction determination apparatus configured to: calculate a lateral jerk of the vehicle based on the driving information detected by the at least one sensor, detect an exception event defining a situation where the lateral jerk occurs during normal driving, based on the driving information, detect oversteering of the vehicle by comparing the calculated lateral jerk with a reference value, and determine a driver distraction based on the detected oversteering and exception event.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 3:
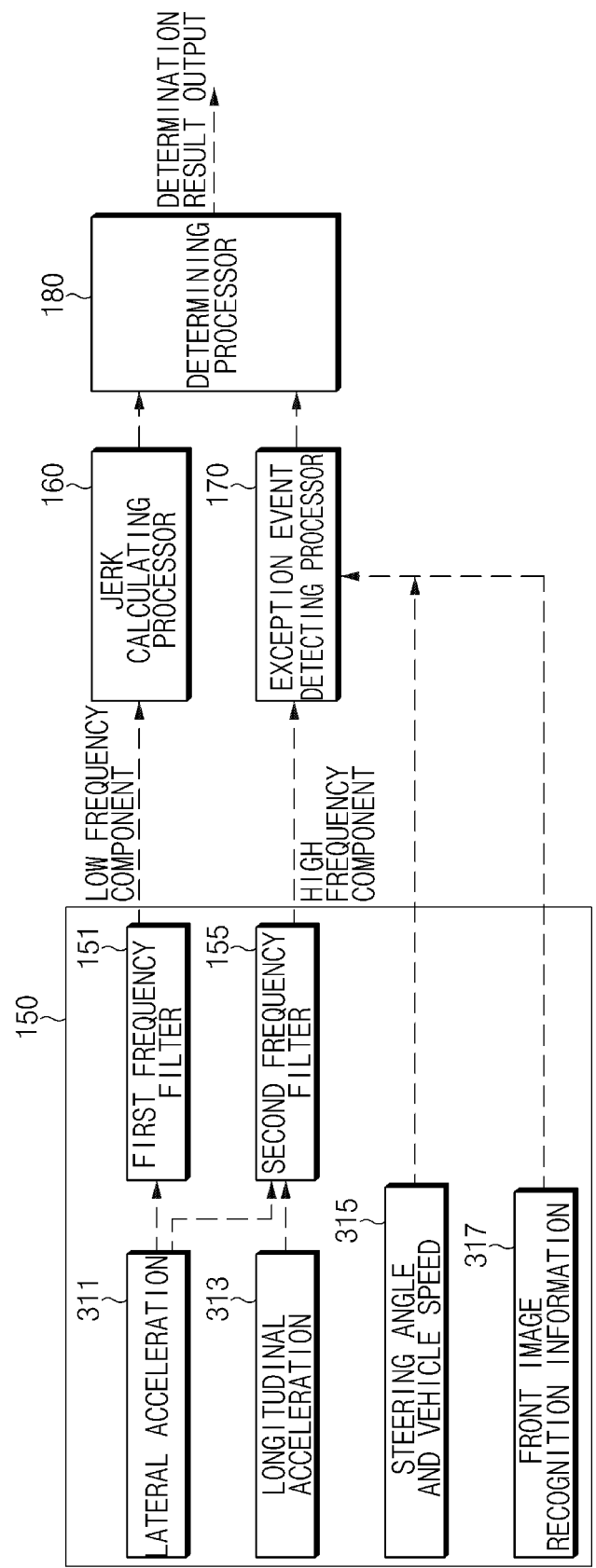
Figure 4A:
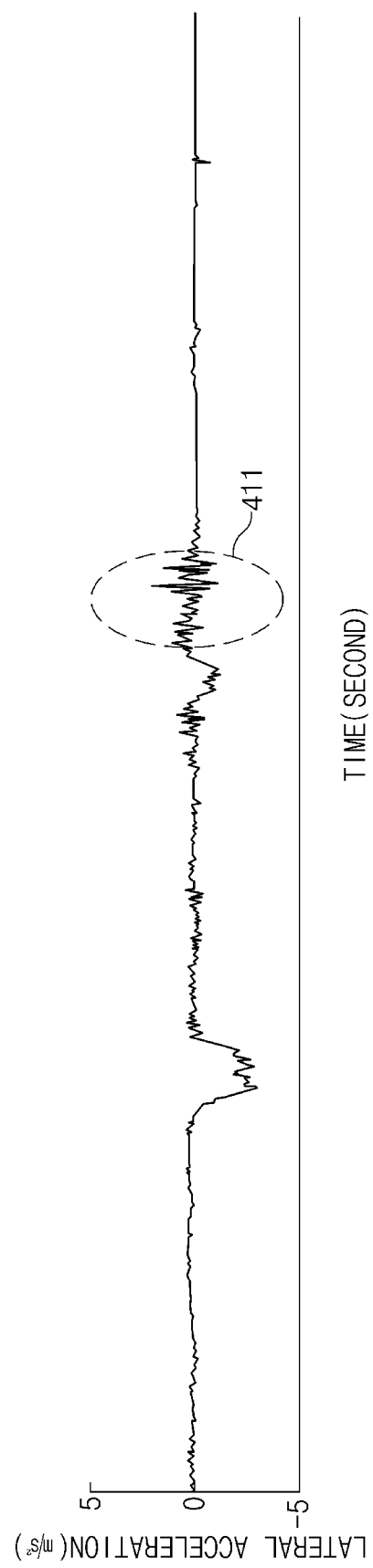
Figure 4B:
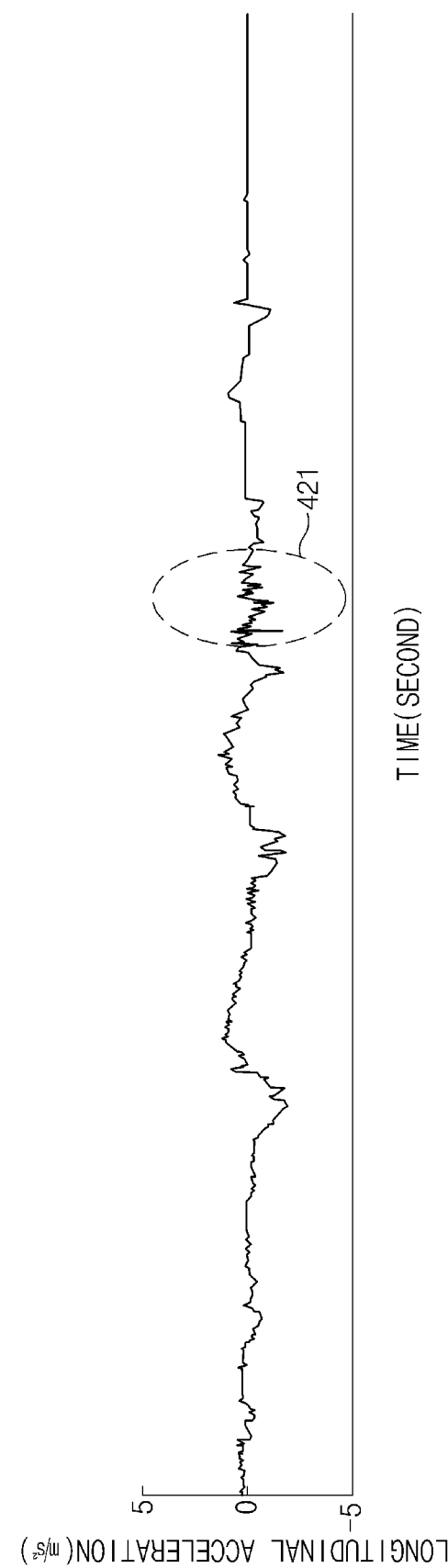
Figure 5:
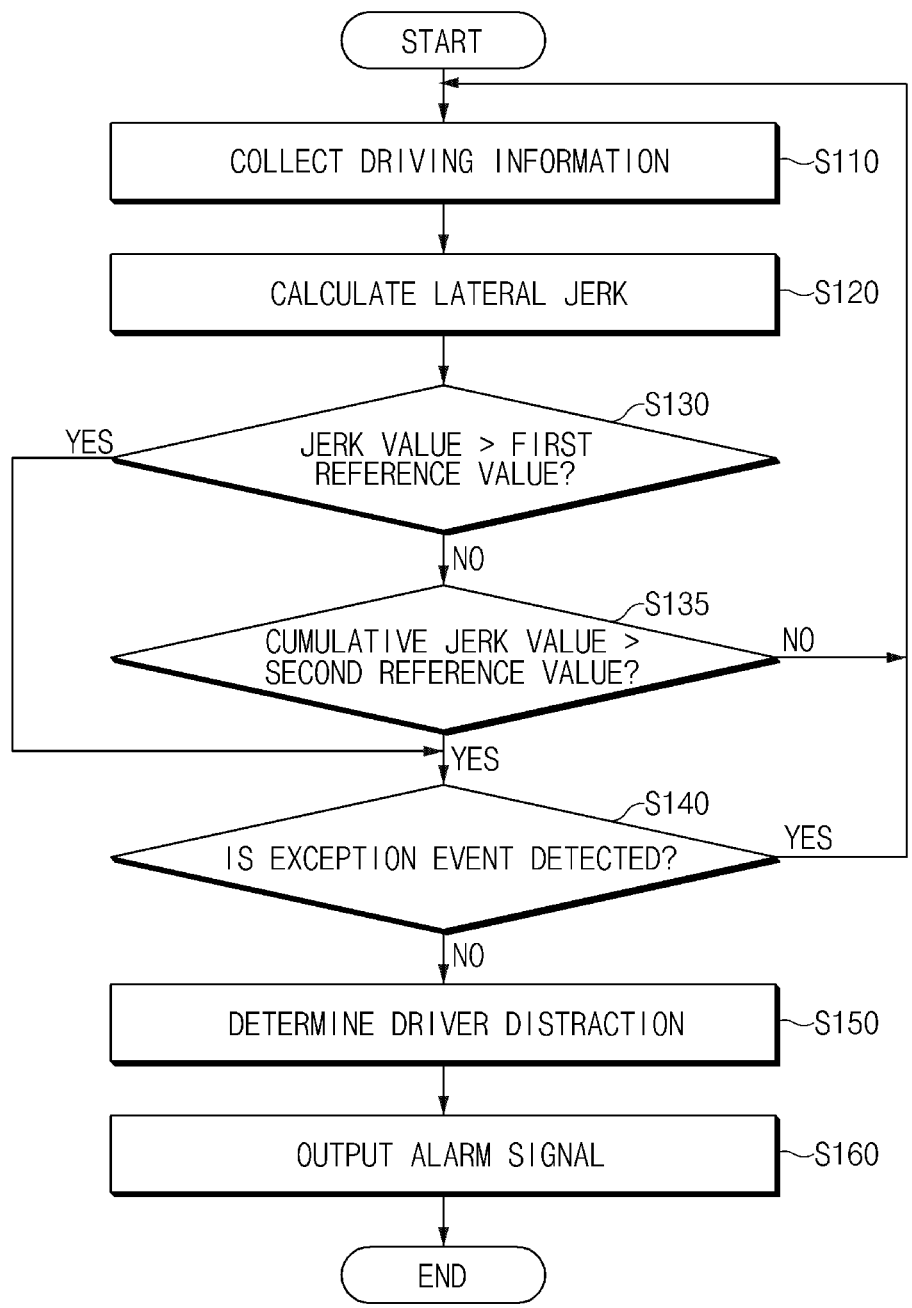
Figure 6:
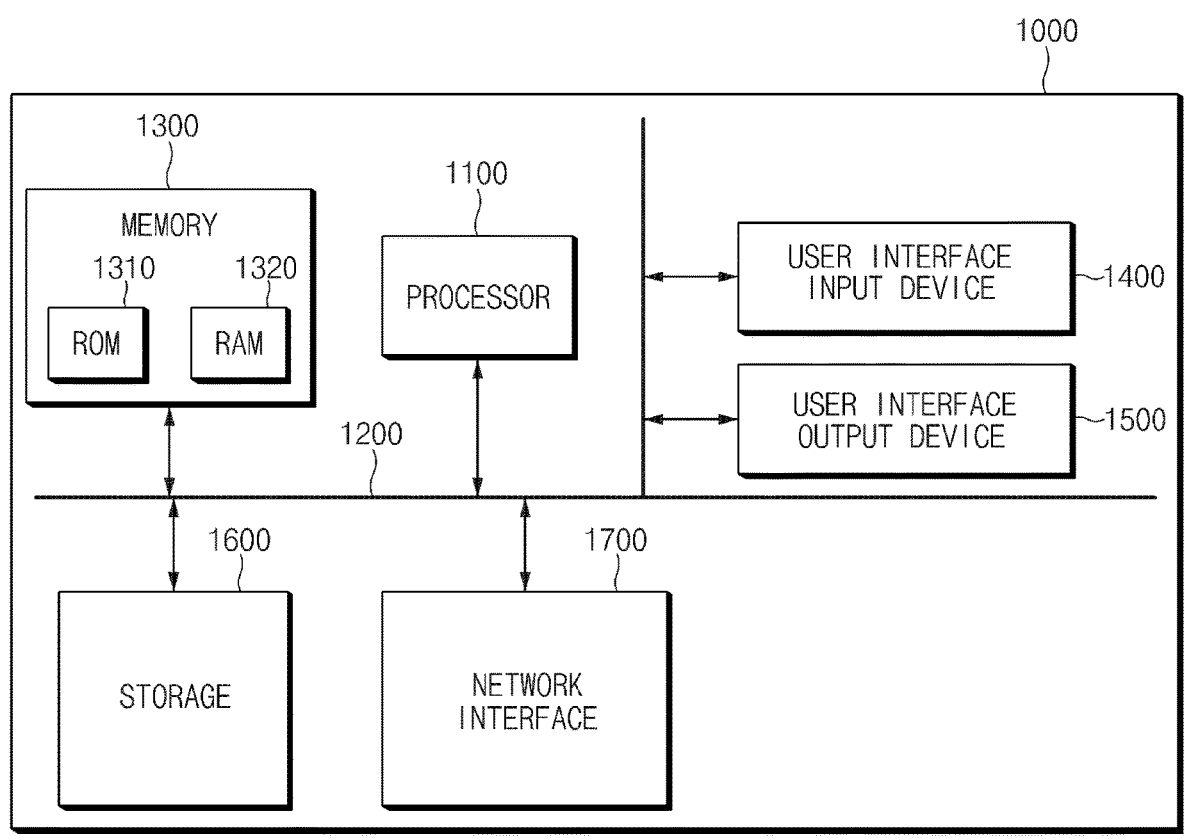

FIGS. 3, 4A, and 4B are drawings illustrating an operation of an apparatus for determining driver distraction based on a jerk;

FIG. 5 is a flowchart illustrating an operation of a method for determining driver distraction based on a jerk; and FIG. 6 is a block diagram illustrating a configuration of a computing system for a method for determining driver distraction based on a jerk.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In adding reference denotations to elements of each drawing, although the same elements are displayed on a different drawing, it should be noted that the same elements have the same denotations. In addition, in describing forms of the present disclosure, if it is determined that a detailed description of related well-known configurations or functions blurs the gist of the present disclosure, it will be omitted.

In describing elements of forms of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Figure 1:
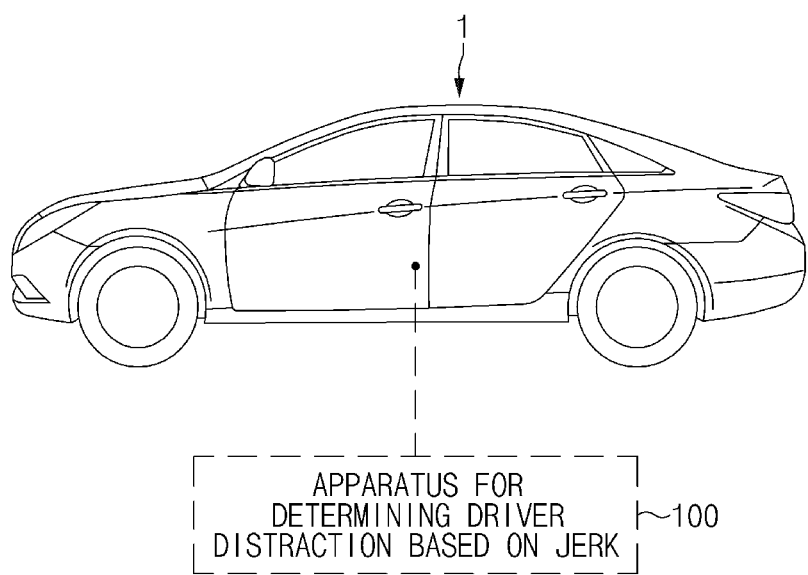
FIG. 1 is a drawing illustrating a vehicle system to which an apparatus for determining driver distraction based on a jerk is applied.

FIG. 1 is a drawing illustrating a vehicle system to which an apparatus for determining driver distraction based on a jerk is applied, in one form of the present disclosure.

As shown in FIG. 1, the vehicle system may include an apparatus for determining driver distraction based on a jerk (hereinafter referred to as "driver distraction determination apparatus") to determine a driver distraction when a vehicle 1 is traveling.

In this case, the vehicle 1 may include at least one sensor for detecting driving information while driving.

The driver distraction determination apparatus 100 may calculate a lateral jerk value of the vehicle 1 using driving information detected by the at least one sensor while the vehicle 1 travels and may compare the calculated lateral jerk value with a reference value to determine a driver distraction.

Herein, the jerk may be a vector for specifying a rate of change of acceleration and may be represented as a third derivative about a displacement time. For example, when the vehicle 1 starts at a start time and stops at an end time, the jerk may be represented as a value obtained by differentiating lateral acceleration in an interval between the start time and the end time.

In this case, the driver distraction determination apparatus 100 may compare a lateral jerk value calculated in a moment (or at a specific time) with a first reference value or may compare a lateral jerk value accumulated during a constant time with a second reference value and may detect oversteering depending on the compared result. Thus, the driver distraction determination apparatus 100 may determine a driver distraction based on whether the oversteering is detected.

Herein, when a pre-defined exception event occurs, although oversteering is detected, the driver distraction determination apparatus 100 may determine that a current state is not a driver distraction.

A description will be given of a detailed configuration of the driver distraction determination apparatus 100 in one form of the present disclosure with reference to FIG. 2.

The driver distraction determination apparatus 100 may be implemented in the form of an independent hardware device including a memory and a processor for processing each operation or may be driven in the form of being included in another hardware device such as a microprocessor or a universal computer system.

Furthermore, the driver distraction determination apparatus 100 may be implemented in the vehicle 1. In this case, the driver distraction determination apparatus 100 may be integrated with control units in the vehicle 1. Alternatively, the driver distraction determination apparatus 100 may be implemented independently of the control units in the vehicle 1 and may be connected with the control units of the vehicle 1 by a separate connection means.

Figure 2:
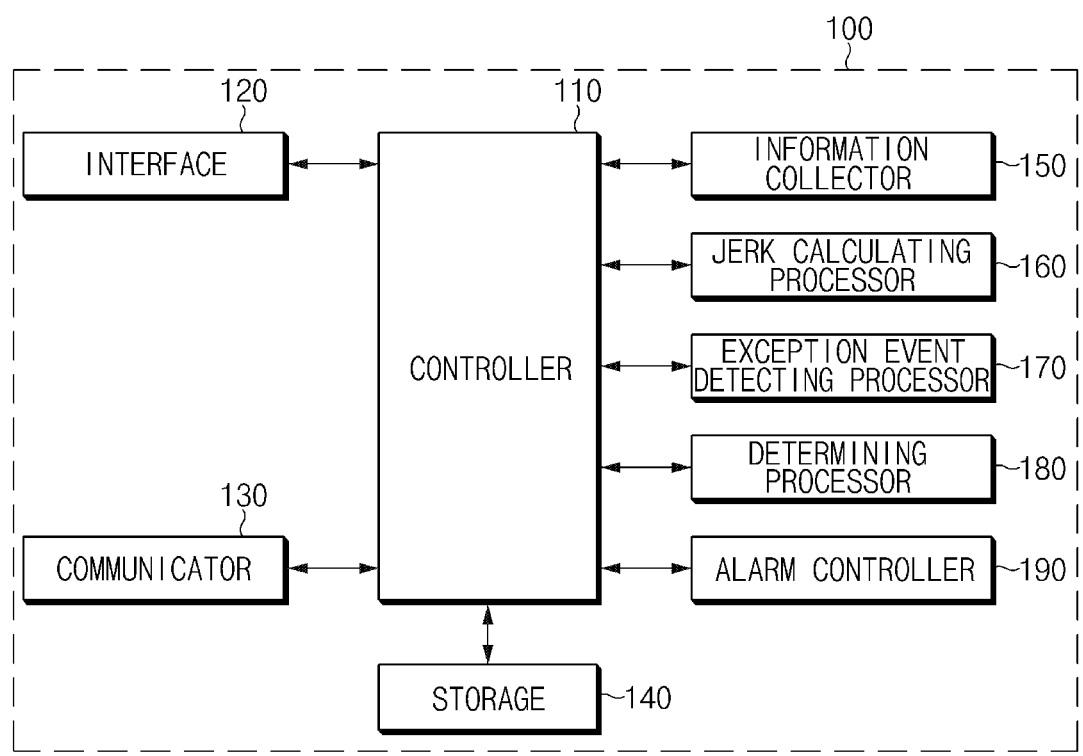
FIG. 2 is a block diagram illustrating a configuration of an apparatus for determining driver distraction based on a jerk.

FIG. 2 is a block diagram illustrating a configuration of an apparatus for determining driver distraction based on a jerk in one form of the present disclosure.

Referring to FIG. 2, the driver distraction determination apparatus 100 may include a controller 110, an interface 120, a communicator 130, a storage 140, an information collector 150, a jerk calculating processor 160, an exception event detecting processor 170, a determining processor 180, and an alarm controller 190. Herein, the controller 110, the information collector 150, the jerk calculating processor 160, the exception event detecting processor 170, the determining processor 180, and the alarm controller 190 of the driver distraction determination apparatus 100 may be implemented as at least one or more processors.

The controller 110 may process a signal transmitted between respective components of the driver distraction determination apparatus 100.

The interface 120 include an input means for receiving a control instruction from a user and an output means for outputting an operation state, an operation result, and the like of the driver distraction determination apparatus 100.

Herein, the input means may include a key button and may further include a mouse, a joystick, a jog shuttle, a stylus pen, and the like. Also, the input means may include a soft key implemented on a display.

The output means may include the display and may further include an acoustic signal output means such as a speaker or a buzzer. In this case, if a touch sensor such as a touch film, a touch sheet, or a touch pad is installed in the display, the display may operate as a touch screen and may be implemented in the form of integrating the input means with the output means.

In this case, the display may include at least one of a liquid crystal display (LCD), a thin film transistor-LCD (TFT-LCD), an organic light-emitting diode (OLED), a flexible display, and a three-dimensional (3D) display.

The communicator 130 may include a communication module for supporting a communication interface with sensors, electronics, and/or control units mounted on the vehicle 1. As an example, the communication module may receive driving information of the vehicle 1 from sensors and/or control units loaded into the vehicle 1. The driving information of the vehicle 1 may include lateral acceleration, longitudinal acceleration, a steering angle, a vehicle speed, front image recognition information, and the like. Herein, the front image recognition information may include curvature information, lane detection information, and/or the like. Moreover, the communication module may receive curved road detection information and/or lane change detection information from a driving assist system.

Herein, the communication module may include a module for supporting vehicle network communication such as controller area network (CAN) communication, local interconnect network (LIN) communication, and flex-ray communication.

Further, the communication module may include a module for wireless Internet access or a module for short range communication. Herein, wireless Internet technologies may include a wireless local area network (WLAN), wireless broadband (Wibro), wireless-fidelity (Wi-Fi), and the like. Short range communication technologies may include Bluetooth, ZigBee, radio frequency identification (RFID), infrared data association (IrDA), and the like.

The storage 140 may store data, an algorithm, and/or the like desired for operating the driver distraction determination apparatus 100.

The storage 140 may store driving information of the vehicle 1, received via the communicator 130. Furthermore, the storage 140 may store condition information, a command, and/or a determination algorithm for determining a driver distraction. As an example, the storage 140 may store a command and/or an algorithm for calculating a lateral jerk, detecting an exception event, or detecting oversteering.

Herein, the storage 140 may include storage media such as a random access memory (RAM), a static RAM (SRAM), a read-only memory (ROM), a programmable ROM (PROM), and an electrically erasable PROM (EEPROM).

The flow of a detailed operation of the information collector 150, the jerk calculating processor 160, the exception event detecting processor 170, and the determining processor 180 may be represented as FIG. 3. FIG. 3 is a drawing illustrating an operation of an apparatus for determining driver distraction based on a jerk in one form of the present disclosure.

Thus, a description will be given of a detailed operation of the information collector 150, the jerk calculating processor 160, the exception event detecting processor 170, and the determining processor 180 with reference to FIGS. 2 and 3.

First of all, the information collector 150 may analyze driving information of the vehicle 1, received via the communicator 130, and may detect information desired for calculating a lateral jerk.

As an example, when lateral acceleration information is received via the communicator 130, the information collector 150 may detect a low frequency component of lateral acceleration 311, for example, a frequency component of the 0.5-2 Hz band of resulting in poor riding quality of a driver, using a first frequency filter 151. Since a frequency component by motion of a vehicle in a general driving situation is difficult to be changed to a higher frequency than approximately 2 Hz, a low frequency component of less than or equal to approximately 2 Hz, which occurs in the driving situation, may be recognized as a signal component by vehicle control of the driver. Thus, when most of a received signal is a low frequency component passing through the first frequency filter 151, the information collector 150 may recognize a current environment as an environment where a vehicle travels over small bumps in the road.

The information collector 150 may deliver the detected low frequency component of the lateral acceleration 311 to the jerk calculating processor 160. Herein, the information collector 150 may reduce the influence of noise when calculating a jerk by delivering only the low frequency component of the lateral acceleration 311 to the jerk calculating processor 160.

Furthermore, when lateral acceleration information or longitudinal acceleration information is received via the communicator 130, the information collector 150 may detect a noise component of lateral acceleration 311 or longitudinal acceleration 313, that is, a high frequency component using a second frequency filter 155. In this case, the high frequency component of the lateral acceleration 311 or the longitudinal acceleration 313 may include, for example, a frequency component higher than the 2 Hz band. Although a frequency component which occurs by motion of a vehicle in the general driving situation is difficult to be changed to a higher frequency than approximately 2 Hz, when the vibration of the vehicle occurs due to bumps in the road, road payment fault, and/or the like, a higher frequency component than approximately 2 Hz may occur. Thus, when most of a received signal is a high frequency component passing through the second frequency filter 155, the information collector 150 may recognize a current environment as an environment where the vehicle travels over large bumps in the road.

The information collector 150 may deliver the detected high frequency component of the lateral acceleration 311 or the longitudinal acceleration 313 to the exception event detecting processor 170. When variation of a lateral jerk, which occurs in a situation which is not a general driving environment, is not due to abnormal driving of a driver, the exception event detecting processor 170 may detect the variation of the lateral jerk as an exception event. Thus, the determining processor 180 may fail to determine a driver distraction by the detection of the exception event.

Herein, the first frequency filter 151 and the second frequency filter 155 may be different filters or may be the same one filter.

As an example, each of the first frequency filter 151 and the second frequency filter 155 may be $11^{th}$ order Hamming window based finite impulse response (FIR) filter. A cutoff frequency of each of the first frequency filter 151 and the second frequency filter 155 may be set to 3 Hz.

Furthermore, the information collector 150 may collect a steering angle and vehicle speed 315 and front image recognition information 317, which are received via the communicator 130. Further, the information collector 150 may collect curved road detection information and/or lane detection information received from a driving assist system. In this case, the information collector 150 may deliver the collected steering angle, vehicle speed, front image recognition information, curved road detection information and/or lane detection information to the exception event detecting processor 170.

The jerk calculating processor 160 may calculate a lateral jerk using the low frequency component of the lateral acceleration, delivered from the information collector 150.

In this case, the jerk calculating processor 160 may calculate the lateral jerk using Equation 1 below.

$$\text{lat\_jerk}[n] = \frac{(\text{lat\_acc}[n] - \text{lat\_acc}[n-1])}{T_s} \quad \text{[Equation 1]}$$

In Equation 1 above, lat_jerk may refer to a lateral jerk, lat_acc may refer to a low frequency signal of lateral acceleration 311 passing through the first frequency filter 151, $T_s$ may refer to a sampling time, and [n] may refer to a time index.

When the calculation of the lateral jerk is completed using Equation 1 above, the jerk calculating processor 160 may deliver the calculated lateral jerk value to the controller 110 and/or the determining processor 180.

Meanwhile, the jerk calculating processor 160 may calculate a lateral jerk during a predetermined time and may deliver an accumulated value of the lateral jerk, calculated during the predetermined time, to the controller 110 and/or the determining processor 180.

The exception event detecting processor 170 may monitor whether a pre-defined exception event is detected and may deliver the result of detecting the exception event to the controller 110 and/or the determining processor 180.

Herein, the exception event may correspond to an event where a lateral jerk is able to occur during normal driving. As an example, the exception event may correspond to a road pavement fault event, a curved road driving event, a lane change event, and/or the like.

In this case, the exception event detecting processor 170 may determine a road pavement state using the high frequency component of the lateral acceleration 311 or the longitudinal acceleration 313, delivered from the information collector 150. A description will be given of the operation of determining the road pavement state using the high frequency component of the lateral acceleration 311 or the longitudinal acceleration 313 with reference to FIGS. 4A and 4B.

First of all, FIG. 4A illustrates a frequency component of lateral acceleration. FIG. 4B illustrates a frequency component of longitudinal acceleration.

As shown in FIGS. 4A and 4B, each of lateral and longitudinal acceleration signals may include a high frequency noise component. A high frequency component of each of the lateral and longitudinal acceleration signals may be generated by white noise of the sensor itself, vibration of a vehicle 1 of FIG. 1 by an engine, or shaking of the vehicle 1 by a bump in the road. The white noise of the sensor itself and the vibration of the vehicle 1 by the engine among the causes where the high frequency component is generated may be noise sources where they are continuously generated while driving, but the bump in the road may be a noise source where it is intermittently generated. Thus, a situation where a high frequency component of a level which is temporarily high in an interval which is within a predetermined time, for example, a level higher than 2 Hz, is detected may be defined as an exception event not to detect oversteering.

Thus, an exception event detecting processor 170 of FIG. 2 may determine a road pavement fault state by calculating a level of a high frequency component of lateral acceleration and/or longitudinal acceleration.

As shown in reference numerals 411 and 412 of FIGS. 4A and 4B, a high frequency component of each of lateral acceleration and longitudinal acceleration may be higher in level in an interval where a road pavement state is faulty than another interval.

Thus, the exception event detecting processor 170 may calculate a level of a high frequency component of lateral acceleration and/or longitudinal acceleration and may detect a road pavement fault event. When the road pavement fault event is detected, the exception event detecting processor 170 may deliver the result of detecting the exception event to a determining processor 180 of FIG. 2.

Furthermore, in a curved road driving situation and/or a lane change situation, a lateral jerk which has an influence on riding quality may occur during normal driving. Thus, the curved road driving situation and/or the lane change situation may be defined as an exception event not to detect oversteering.

Thus, the exception event detecting processor 170 may detect a curved road driving event and/or a lane change event based on driving information of the vehicle 1, collected by an information collector 150 of FIG. 2, for example, steering angle and vehicle speed information or front image recognition information.

As an example, the exception event detecting processor 170 may analyze a form of a lateral behavior of the vehicle 1 from a steering angle and a vehicle speed. When a lateral velocity is kept steady during a predetermined time, the exception event detecting processor 170 may determine a current situation as a curved road driving situation to detect a curved road driving event.

Furthermore, the exception event detecting processor 170 may analyze a form of a lateral behavior of the vehicle 1 from a steering angle and a vehicle speed. When lateral displacement, a size of which has a width of one lane, for example, 3 m to 3.5 m, occurs temporarily, the exception event detecting processor 170 may determine a current situation as a lane change situation to detect a lane change event.

When curved land detection information and/or lane change detection information is received from a driving assist system, the exception event detecting processor 170 may detect a curved road driving event and/or a lane change event from the received curved road detection information and/or the received lane change detection information.

When the curved road driving event and/or the lane change event is detected, the exception event detecting processor 170 may deliver the result of detecting the exception event to the determining processor 180.

The determining processor 180 may detect oversteering using a lateral jerk value delivered from a controller 110 or a jerk calculating processor 160 of FIG. 2. Furthermore, the determining processor 180 may determine a driver distraction depending on whether the oversteering is detected.

As an example, the determining processor 180 may compare a lateral jerk value calculated at a specific time by the jerk calculating processor 160 with a first reference value. When the lateral jerk value calculated at the specific time is greater than the first reference value, the determining processor 180 may detect the oversteering. When the oversteering is detected, the determining processor 180 may determine a current state as a driver distraction and may deliver the result of determining the driver distraction to the controller 110 and/or an alarm controller 190 of FIG. 2.

Meanwhile, when the lateral jerk value calculated at the specific time is less than or equal to the first reference value, the determining processor 180 may determine that the oversteering is not detected to determine that the current state is not the driver distraction. Thus, the determining processor 180 may deliver the determined result to the controller 110.

As another example, the determining processor 180 may compare a lateral jerk value cumulatively calculated during a predetermined time by the jerk calculating processor 160 with a second reference value. When the lateral jerk value cumulatively calculated during the predetermined time is greater than the second reference value, the determining processor 180 may determine the oversteering. When the oversteering is detected, the determining processor 180 may determine a current state as the driver distraction and may deliver the result of determining the driver distraction to the controller 110 and/or the alarm controller 190.

Meanwhile, when the lateral jerk value cumulatively calculated during the predetermined time is less than or equal to the second reference value, the determining processor 180 may determine that the oversteering is not detected to determine that the current state is not the driver distraction. Thus, the determining processor 180 may deliver the determined result to the controller 110.

Meanwhile, when the oversteering is detected, the determining processor 180 may verify whether an exception event is detected from the exception event detecting processor 170. When verifying that at least one predetermined exception event is detected by the exception event detecting processor 170, although the oversteering is detected, the determining processor 180 may determine that a current state is not the driver distraction. In this case, the determining processor 180 may deliver the determined result to the controller 110.

When the result of determining the driver distraction is received from the determining processor 180, the alarm controller 190 may output an alarm signal as a result of determining the driver distraction.

As an example, the alarm controller 190 may output an alarm message on a display screen of an interface 120 of FIG. 2. Furthermore, the alarm controller 190 may output an alarm sound and/or an alarm message on an acoustic signal output means of the interface 120.

A description will be given in detail of an operation of the apparatus having the above configuration in one form of the present disclosure.

FIG. 5 is a flowchart illustrating an operation of a method for determining driver distraction based on a jerk in one form of the present disclosure.

Referring to FIG. 5, in operation S110, a driver distraction determination apparatus 100 of FIG. 1 may collect driving information of a vehicle 1 of FIG. 1, for example, lateral acceleration, longitudinal acceleration, a steering angle, a vehicle speed, front image recognition information, curved road detection information, lane change information, and/or the like, from sensors, a control unit, a driving assist system, and/or the like when the vehicle 1 is traveling.

In operation S120, the driver distraction determination apparatus 100 may detect a low frequency component of lateral acceleration among the driving information of the vehicle 1, collected in operation S110, and may calculate a lateral jerk of the vehicle 1. In operation S120, the driver distraction determination apparatus 100 may calculate the lateral jerk using Equation 1 above. Herein, the driver distraction determination apparatus 100 may calculate the lateral jerk at one time. Furthermore, the driver distraction determination apparatus 100 may calculate a lateral jerk accumulated during a predetermined time.

When the calculation of the lateral jerk is complemented in operation S120, in operation S130, the driver distraction determination apparatus 100 may determine whether the lateral jerk value calculated at the one time is greater than a first reference value. Meanwhile, when the lateral jerk value calculated at the one time is less than or equal to the first reference value, in operation S135, the driver distraction determination apparatus 100 may determine whether the lateral jerk value cumulatively calculated during the predetermined time is greater than a second reference value.

In FIG. 5, one form is exemplified as operations S130 and S135 are performed. However, forms are not limited thereto. According to an implementation form, any one of operation S130 or S135 may be omitted.

When the lateral jerk value is less than or equal to the first reference value in operation S130 and when the cumulatively calculated lateral jerk is less than or equal to the second reference value in operation S135, the driver distraction determination apparatus 100 may determine that a current state is not a driver distraction to perform the operation again from operation S110.

Meanwhile, when the lateral jerk value is greater than the first reference value in operation S130 or when the cumulatively calculated lateral jerk is greater than the second reference value in operation S135, in operation S140, the driver distraction determination apparatus 100 may determine whether an exception event is detected. Since the exception event is described above, a repeated description will be omitted.

When the exception event is detected in operation S140, the driver distraction determination apparatus 100 may determine that the current state is not the driver distraction to perform the operation again from operation S110.

Meanwhile, when the exception event is not detected in operation S140, in operation S150, the driver distraction determination apparatus 100 may determine that the current state is the driver distraction. In operation S160, the driver distraction determination apparatus 100 may output an alarm signal.

FIG. 6 is a block diagram illustrating a configuration of a computing system in which a method according to one form of the present disclosure is executed.

Referring to FIG. 6, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the forms disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside in a user terminal. Alternatively, the processor and storage medium may reside as a separate component of the user terminal.

According to one form of the present disclosure, the driver distraction determination apparatus may stably detect a driver distraction without being greatly influenced by speed and steering information of a vehicle by monitoring a level of a lateral jerk and detecting the driver distraction.

While the present disclosure has been described with reference to exemplary forms, it will be apparent to those skilled in the art that various changes and modifications may be made without departing from the spirit and scope of the present disclosure.

Therefore, exemplary forms of the present disclosure are not limiting, but illustrative, and the spirit and scope of the present disclosure is not limited thereto. It should be interpreted that all technical ideas which are equivalent to the present disclosure are included in the spirit and scope of the present disclosure.

What is claimed is:

1. An apparatus for determining driver distraction based on a jerk, the apparatus comprising:
    a jerk calculating processor configured to calculate a lateral jerk of a vehicle based on driving information collected when the vehicle is traveling;
    an exception event detecting processor configured to detect an exception event defining a situation where the lateral jerk occurs during normal driving, based on the collected driving information; and
    a determining processor configured to detect oversteering of the vehicle by comparing the calculated lateral jerk with a reference value and to determine a driver distraction based on the detected oversteering and exception event,
    wherein the driving information comprises a lateral acceleration, and the jerk calculation processor is configured to:
        calculate a difference value between a first low frequency signal of the lateral acceleration at a first predetermined time and a second low frequency signal of the lateral acceleration at a second predetermined time,
        divide the difference value by a sampling time, and
        calculate the lateral jerk therefrom.

2. The apparatus of claim 1, wherein the determining processor is configured to:
    compare a lateral jerk calculated at a specific time with a first reference value; and
    determine the oversteering when the lateral jerk calculated at the specific time is greater than the first reference value.

3. The apparatus of claim 1, wherein the determining processor is configured to:
    compare a lateral jerk cumulatively calculated during a predetermined time period with a second reference value; and
    determine the oversteering when the cumulatively calculated lateral jerk is greater than the second reference value.

4. The apparatus of claim 1, wherein the determining processor is configured to:
    determine the driver distraction, when the oversteering is detected and when the exception event is not detected.

5. The apparatus of claim 1,
    wherein the jerk calculating processor is configured to:
    calculate the lateral jerk based on a low frequency signal of the lateral acceleration.

6. The apparatus of claim 1, wherein the exception event comprises at least one of a road pavement fault event, a curved road driving event, or a lane change event.

7. The apparatus of claim 6, wherein the driving information comprises at least one of a lateral acceleration or a longitudinal acceleration, and
    wherein the exception event detecting processor is configured to:
    detect the road pavement fault event based on a level of a high frequency signal of the lateral acceleration or the longitudinal acceleration.

8. The apparatus of claim 7, wherein the exception event detecting processor is configured to:
    determine the road pavement fault event when a high frequency component which is equal to or greater than a predetermined level is detected within a predetermined time period.

9. The apparatus of claim 6, wherein the driving information comprises at least one of a steering angle or a vehicle speed, and
    wherein the exception event detecting processor is configured to:
    analyze a lateral behavior of the vehicle based on the steering angle and the vehicle speed; and determined the curved road driving event, when a lateral velocity is maintained over a predetermined time.

10. The apparatus of claim 6, wherein the driving information comprises at least one of a steering angle or a vehicle speed, and
wherein the exception event detecting processor is configured to:
analyze a lateral behavior of the vehicle based on the steering angle and the vehicle speed; and
determine the lane change event, when a lateral displacement corresponding to a lane width occurs.

11. The apparatus of claim 6, wherein the driving information comprises front image recognition information of the vehicle, and
wherein the exception event detecting processor is configured to:
determine at least one of the curved road driving event, or the lane change event based on the front image recognition information.

12. The apparatus of claim 1, further comprising:
an alarm controller configured to output an alarm signal, when the driver distraction is determined.

13. A method for determining driver distraction based on a jerk, the method comprising:
calculating, a jerk calculating processor, a lateral jerk of a vehicle based on driving information collected when the vehicle is traveling;
detecting, by an exception event detecting processor, an exception event defining a situation where the lateral jerk occurs during normal driving, based on the collected driving information; and
detecting, by a determining processor, oversteering of the vehicle by comparing the calculated lateral jerk with a reference value and determining a driver distraction based on the detected oversteering and the exception event,
wherein the driving information comprises a lateral acceleration, and
wherein calculating the lateral jerk includes:
calculating a difference value between a first low frequency signal of the lateral acceleration at a first predetermined time and a second low frequency signal of the lateral acceleration at a second predetermined time, and
dividing the difference value by a sampling time.

14. The method of claim 13, wherein the determining the driver distraction comprises:
comparing a lateral jerk calculated at a specific time with a first reference value; and
determining the oversteering, when the lateral jerk calculated at the specific time is greater than the first reference value.

15. The method of claim 13, wherein the determining the driver distraction comprises:
comparing a lateral jerk cumulatively calculated during a predetermined time period with a second reference value; and
determining the oversteering, when the cumulatively calculated lateral jerk is greater than the second reference value.

16. The method of claim 13, wherein the determining the driver distraction comprises:
determining the driver distraction, when the oversteering is detected and when the exception event is not detected.

17. The method of claim 13, wherein the exception event comprises at least one of a road pavement fault event, a curved road driving event, or a lane change event.

18. A vehicle system, comprising:
a sensor configured to detect driving information when a vehicle is traveling; and
a driver distraction determination apparatus configured to:
calculate a lateral jerk of the vehicle based on the driving information detected by the sensor,
detect an exception event defining a situation where the lateral jerk occurs during normal driving, based on the driving information,
detect oversteering of the vehicle by comparing the calculated lateral jerk with a reference value, and
determine a driver distraction based on the detected oversteering and exception event,
wherein the driving information comprises a lateral acceleration, and
wherein the driver distraction determination apparatus is configured to:
calculate a difference value between a first low frequency signal of the lateral acceleration at a first predetermined time and a second low frequency signal of the lateral acceleration at a second predetermined time,
divide the difference value by a sampling time, and
calculate the lateral jerk therefrom.

* * * * *